US009230428B2

(12) United States Patent
Meier et al.

(10) Patent No.: US 9,230,428 B2
(45) Date of Patent: Jan. 5, 2016

(54) FIELD DEVICE OF PROCESS AUTOMATION

(75) Inventors: Jürgen Meier, Maulburg (DE); Martin Lange, Freiburg (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 1294 days.

(21) Appl. No.: 13/124,417

(22) PCT Filed: Sep. 18, 2009

(86) PCT No.: PCT/EP2009/062088

§ 371 (c)(1), (2), (4) Date: Sep. 8, 2011

(87) PCT Pub. No.: WO2010/043468

PCT Pub. Date: Apr. 22, 2010

(65) Prior Publication Data

US 2011/0309813 A1 Dec. 22, 2011

(30) Foreign Application Priority Data

Oct. 15, 2008 (DE) ........................ 10 2008 042 851

(51) Int. Cl.
*G05B 23/02* (2006.01)
*G08C 19/02* (2006.01)

(52) U.S. Cl.
CPC .................................... *G08C 19/02* (2013.01)

(58) Field of Classification Search
CPC ..................... H02M 3/156; H02M 2001/0032; H02M 3/33507; Y02B 70/1466; G08B 25/018
USPC ................. 323/222, 237, 266, 267, 271, 275, 323/282–288, 299; 324/251, 207.02, 457, 324/523
See application file for complete search history.

(56) References Cited

U.S. PATENT DOCUMENTS 5,790,046 A * 8/1998 Blossfeld ................. G01D 1/18 307/116
5,881,148 A * 3/1999 Koenig ................. H04M 3/005 323/270
7,262,628 B2 * 8/2007 Southwell ........... H02M 3/1584 323/266
8,054,071 B2 * 11/2011 Doogue ................. G01D 5/145 324/207.2
2001/0043057 A1 11/2001 Munck
2008/0007307 A1 1/2008 Freiburger

FOREIGN PATENT DOCUMENTS

DE 10 2005 001 601 A1 9/2006
EP 1 158 274 A1 11/2001
EP 1158274 * 11/2001

OTHER PUBLICATIONS

International Search Report, Feb. 19, 2010, EPO, The Netherlands.
(Continued)

*Primary Examiner* — Rajnikant Patel
(74) *Attorney, Agent, or Firm* — Bacon & Thomas, PLLC

(57) ABSTRACT

A field device of process automation technology having an interface for output of an electrical current signal and a specifying unit, which provides a value, on which depends an electrical current signal to be output via the interface. A first controllable electrical current sink and a second controllable electrical current sink are provided. The first controllable electrical current sink and the second controllable electrical current sink are settable to predeterminable electrical current levels, and that the first controllable electrical current sink and the second controllable electrical current sink are connected with the interface in such a manner that the electrical current signal which at the interface essentially depends on the lower of the predeterminable electrical current levels, to which the first controllable electrical current sink and the second controllable electrical current sink are set.

11 Claims, 2 Drawing Sheets

(56) References Cited

OTHER PUBLICATIONS

English translation of the IPR, Apr. 29, 2011, WIPO, Geneva.
Raab H: "Ausfallinformation bei Digitalen 1-12 Messumformern mit nalogen Ausgangssignal: Vereinheitlichung des signalpegels. Öfailure information for digital field instruments with analogue output: standardization of the signal level" automatisierungstechnische praxis -atp, oldenbourg industrieverlag, Munchen, DE, Bd. 36, Nr. 7, I. Jul. 1, 1994, Seiten 30-32,34/35, XPOO0454543 ISSN: 0178-2320 das ganze Dokument.

* cited by examiner

FIELD DEVICE OF PROCESS AUTOMATION

TECHNICAL FIELD

The invention relates to a field device of process automation technology having at least one interface for the output of an electrical current signal, and having at least one specifying unit, which specifies at least one value, on which depends the electrical current signal to be output via the interface.

BACKGROUND DISCUSSION

In the state of the art, field devices—especially measuring devices—are known, which output signals and especially measured values as 4 . . . 20 mA signals. When an error is present in the field device, a so-called error signal is then output, which usually lies outside of the actual signal range between 4 and 20 mA. The error signal thus lies either below 4 mA or above 20 mA.

In the context of the idea of self-checking field devices, it is, in such case, also required that the device should be able to signal such an error current. In such case, a problem resides, however, in the fact that this error signal should itself not reach the output of the device, since this involves a test and not the presence of such an error. As a simple solution, corresponding error signals are consequently intentionally produced by the field devices in test time periods. However, in these periods of time, a normal process operation is, consequently, not possible.

SUMMARY OF THE INVENTION

An object of the invention is, consequently, to provide a field device which permits a checking of the error signaling without this leading to impairment, especially, of units connected after the field device.

The object is achieved by the invention in that at least a first controllable electrical current sink and a second controllable electrical current sink are provided, that the first controllable electrical current sink and the second controllable electrical current sink are embodied in such a manner, that the first controllable electrical current sink and the second controllable electrical current sink are settable to predeterminable electrical current levels, and that the first controllable electrical current sink and the second controllable electrical current sink are connected with the interface in such a manner, that the electrical current signal present at the interface essentially depends on the lower of the predeterminable electrical current levels, to which the first controllable electrical current sink and the second controllable electrical current sink are set. The field device is especially a 4 . . . 20 mA signal field device.

An embodiment provides that the field device signals the presence of an error of the field device by an error signal via the interface, wherein the error signal lies within an error signal interval. The error signal interval lies, in such case, especially between 0 mA and 4 mA, or 3.6 mA, if the interface is a 4 . . . 20 mA interface.

An embodiment includes that the error signal has an electrical current level below a predetermined value, especially smaller than 3.6 mA.

An embodiment provides that the first controllable electrical current sink and the second controllable electrical current sink are connected in series.

An embodiment includes that at least one control unit is provided, and that the control unit is embodied in such a manner, that the control unit, based on the specifying unit, in each case, sets the first controllable electrical current sink and the second controllable electrical current sink to predeterminable electrical current levels.

An embodiment provides that the control unit is embodied in such a manner, that the control unit, based on the specifying unit, controls the first controllable electrical current sink and the second controllable electrical current sink in such a manner, that the signal present at the interface varies in a predeterminable interval.

An embodiment includes that the first controllable electrical current sink comprises at least a first electrical current sink, a first controller, a first resistor and a first measuring resistor, wherein the first measuring resistor is connected in series with the first electrical current sink, and is provided for sensing a first measurement voltage.

An embodiment provides that the second controllable electrical current sink comprises at least a second electrical current sink, a second controller, a second resistor and a second measuring resistor, wherein the second measuring resistor is connected in series with the second electrical current sink and is provided for sensing a second measurement voltage.

An embodiment includes that a capacitor and a diode are installed in the first controllable electrical current sink and/or in the second controllable electrical current sink.

An embodiment provides that, parallel to the first electrical current sink and to the first measuring resistor, a first switch and a first bridging resistor are provided.

An embodiment includes that, parallel to the second electrical current sink and to the second measuring resistor, a second switch and a second bridging resistor are provided.

An embodiment provides that the control unit has at least two microprocessors, which control the first controllable electrical current sink and the second controllable electrical current sink essentially independently of one another.

BRIEF DESCRIPTION OF THE DRAWINGS

The invention will now be explained in greater detail on the basis of the appended drawing, the figures of which show as follows:

FIG. 1 shows a field device 10 of the invention. It is, in such case, for example, a measuring device for determining and/or monitoring a process variable. The process variable can be, for example, fill level, density, viscosity, flow, pH-value or temperature.

Figure 1:
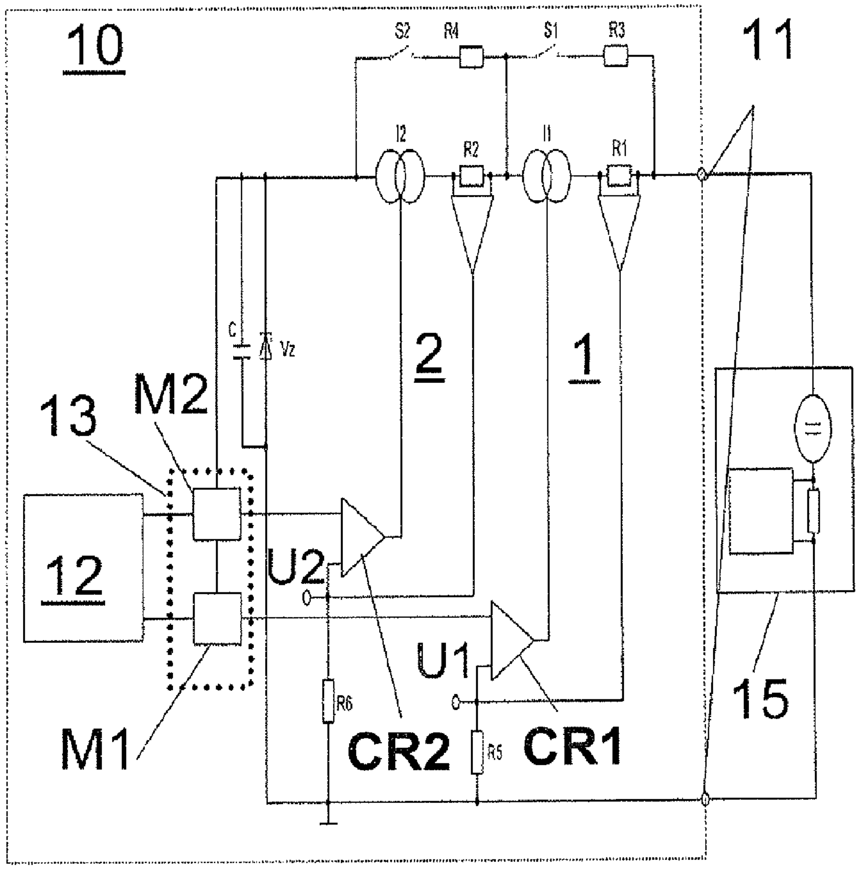
FIG. 1 is a schematic diagram of a field device of the invention.

The field device 10 uses an interface 11, via which, for example, measured values are output as 4 . . . 20 mA signals. In the case that an error is present in the field device 10, a signal is output, whose electrical current level lies outside this range reserved for normal operation. In an embodiment, the "error current" lies below 3.6 mA.

The circuit shown here permits testing of whether this error current can be produced, without the error signal directly reaching the interface 11. In field device 10, two controllable electrical current sinks 1, 2 are connected in series.

A part of the first controllable electrical current sink 1 is an electrical current sink I1. This is an electronic load, whose load current is electronically controllable. An example of this is a field effect transistor (FET). Furthermore, the first controllable electrical current sink 1 comprises the first controller CR1, the first measuring resistor R1 and the first resistor R5. Controller CR1 is an operational amplifier, of which one input is connected with the control unit 13, or especially with the first microprocessor M1 of the control unit 13, and another input is connected with the first resistor R5 and, respectively, with the voltage drop across the first measuring resistor R1. The voltage drop across the first measuring resistor R1 is connected through an operational amplifier. The output of the operational amplifier effects the setting of the electrical current level of the first electrical current sink I1. The input of the controller CR1 not connected with the control unit 13 is connected is via the first resistor R5 with a terminal of the interface 11. This terminal is likewise connected with ground. The first measuring resistor R1 also permits the sensing of a first measurement voltage U1.

The first electrical current sink I1 is connected with the other terminal of the interface 11 and with ground. In this region of the circuit, between the first electrical current sink I1 and ground are also provided a Zener diode Vz and, parallel thereto, a capacitor C. Moreover, there also is a connection between the two series connected current sinks I1 and I2 and the second microprocessor M2 of the control unit 13.

The second controllable electrical current sink 2 is constructed analogously to the first 1. It comprises the second electrical current sink I2, the second controller CR2, the second resistor R6 and the second measuring resistor R2. In such case, the first electrical current sink I1 and the second electrical current sink I2 are connected in series. The second controller CR2 is controlled here via the second microprocessor M2 of the control unit 13. The two microprocessors M1, M2 work independently of one another, and, independently of one another, also set the electrical current levels of the two current sinks I1, I2 via the controllers CR1, CR2. The particular desired value for the electrical current at the interface is predetermined by the specifying unit 12. In such case, this especially involves in the specifying unit 12 the evaluation unit of the sensor component of the field device 10. The electrical current at the interface is thus set in such a manner, that, for example, it corresponds to an ascertained measured value for a process variable, or that, for example, it represents the reaching of a limit value.

In order to report to the schematically represented receiving unit 15 of the signal present at the interface 11 that the field device 11 still is alive, the electrical current signal is varied within a predetermined interval, i.e. it bounces around the desired value of the specifying unit 12 and is thus a signal that the field device 10 is alive. As an example, a desired value of 19 mA is assumed, which alternates between two electrical current values, i.e. there results, for example, an output signal of 19 mA±0.25 mA. This alternation thus shows the receiving unit 15 that the field device 10 is still alive.

If different electrical current levels are set in the case of the first electrical current sink I1 and the second electrical current sink I2, the lower electrical current value is in each case present at the interface 11.

For testing whether the error signal (here an electrical current smaller than 3.6 mA) can be produced, the following components are also provided in the circuit of the invention:

The first controllable electrical current sink 1 has, connected in series with the first electrical current sink I1, a first measuring resistor R1, via which a first measurement voltage U1 is sensed. Provided in parallel to the first electrical current sink I1 and to the first measuring resistor R1 are a first switch S1 and a first bridging resistor R3. Analogously, a second measuring resistor R2 for a second measurement voltage U2, a second switch 52 and a second bridging resistor R4 are provided in the case of the second controllable electrical current sink 2.

As can be seen, the two controllable electrical current sinks 1, 2 are "decoupled" from one another and permit control essentially independently of one another.

Figure 2:
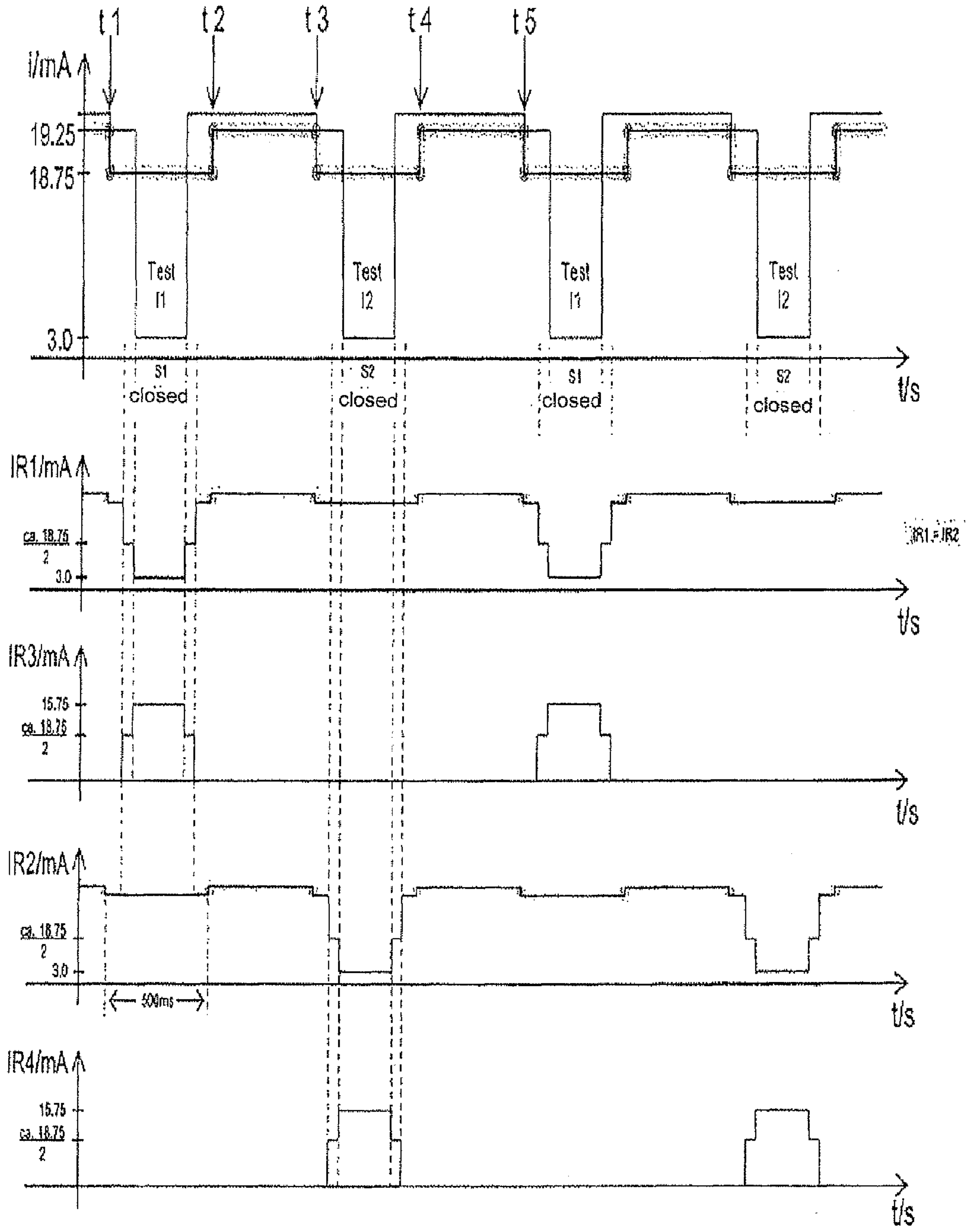
FIG. 2 is a graph of the time behavior of various electrical currents during a test with the field device of the invention of FIG. 1.

For illustrating the functioning of the circuit, FIG. 2 shows the course of events as a function of time and, respectively, the electrical currents that occur. From top to bottom, the following are shown: The output current at the interface 11, the electrical current at the first measuring resistor R1, the electrical current at the first bridging resistor R3, the electrical current at the second measuring resistor R2 and the electrical current curve at the second bridging resistor R4.

For normal operation, switches S1 and S2 are open. Control of the switches occurs, in such case, for example, via the control unit 13, or individually, via the provided microprocessors M1 and M2, which are associated, respectively, with the first controllable electrical current sink I1 and the second controllable electrical current sink I2.

At the point in time t1, the first electrical current sink I1 is set to 19.25 mA and the second electrical current sink I2 to 18.75 mA. The output current at the interface 11 is determined by the second electrical current sink I2. The flowing electrical current is measured via the two measuring resistors R1 and R2 and, in each case, converted via an operational amplifier to a voltage U1 or U2 proportional to the electrical current, and fed via appropriate connections (not shown) to the microprocessors M1 and M2 for checking.

If an electrical current of, for example, 5 mA, were to flow over a parallel path—e.g. the two switches S1, S2 are open, but low-ohm—the controller which is responsible for the flowing electrical current regulates the current in spite of this to the lower value of 18.75 mA; however, in the measurement resistors R1, respectively R2, there is flowing only the difference current of 18.75 mA−5 mA=13.75 mA. Thus, an error is present in the field device 10, and the particular electrical current sink I1 or I2 would set the error current to lower than 3.6 mA.

Now to test whether the field device 10 can reliably set the error current. The course of events shown here is, in such case, purely an example. The perpendicular dashes always give the period of time for which, in each case, a switch is closed.

First, testing the first electrical current sink I1 (test I1 in FIG. 2):

The switch S1 is closed. The electrical current of 18.75 mA divides itself between the branch I1 and R1 and the branch R3 and S1. In both branches, an essentially equal electrical current flows, when the resistors R1 and R3 are equally large and the resistance of the switch S1 and the internal resistance of I1 are very small. The voltage U1 dropping at the measuring resistor R1 is measured and compared with a reference value. The specified value of the electrical current level for the first electrical current sink I1 is then set by the first microprocessor M1 and the first controller CR1 from the above set 19.25 mA to a test value smaller than 18.75 mA, e.g. to 3 mA. The first controller CR1 sets the first electrical current sink I1 in such a manner, that the voltage at the resistor R5 measured via the first measuring resistor R1 corresponds to the desired value specification of the first microprocessor M1, i.e. equals 3 mA. Through the branch R1, I1 there flows therewith 3 mA. The remaining electrical current of 18.75 mA−3 mA flows via the parallel branch composed of the resistor R3 and the switch S1. In the case of this circuit arrangement, test currents are settable between 0 mA and a value of Itestmax1 in the first electrical current sink I1. The value Itestmax1 depends on the relationship between the resistors R3 and R1. If the values are R3=100 ohm and R1=10 ohm, the test current in I1 can be set between 0 mA and R3*Itotal/(R3+R1)=100 ohm*18.75 mA/(100 ohm+10 ohm)=17.05 mA.

The specified value for the first electrical current sink I1 then set via the first microprocessor M1 and the first controller CR1 from 3 mA to a value larger than 19.25 mA. Through the first electrical current sink I1 and the first measuring resistor R1 there then again flows the branch current of 18.75/2 mA. This branch current can be measured as a voltage U1 and compared with a reference value. With these voltage measurements, thus, the correct closing of the switch S1 and the ability of the first electrical current sink I1 to set an electrical current of 3.0 mA can be checked.

In the test time, the branch current Itotal−3 mA flows via the resistor R3 and the switch S1. To the terminals—and, thus, outwardly—there flows constantly 18.75 mA. Then, the switch S1 is opened. The electrical current is still held by the second electrical current sink I2 at 18.75 mA.

At the point in time t2, the specified value for the second electrical current sink I2 is set via the second microprocessor M2 and the second controller CR2 to 19.25 mA. Since the first electrical current sink was set to an electrical current larger than 19.25, the second electrical current sink I2 determines the output current at the interface, which thus amounts to 19.25 mA. The output signal varies, consequently, between the two values of 18.75 mA and 19.25 mA. Thus, the field device 10 shows that it still is alive.

At the point in time t3, the specified value for the first electrical current sink I1 is reduced from the value larger than 19.25 mA to 18.75 mA. The first electrical current sink I1 therewith determines the outward electrical current (18.75 mA). The voltage measurements at R1 and R2, in the defect-free case, in each case yield the right electrical current value. If the value is correct, the switch S1 has opened and the first electrical current sink I1 is in order.

Testing the Second Electrical Current Sink I2:

For this, the second switch S2 is closed. The instantaneous electrical current of 18.75 mA divides itself between the branch I2 and R2 and the branch R4 and S2. In both branches, an approximately equal electrical current flows, when the resistances R2 and R4 are equally large and the resistance of the switch S2 and the internal resistance of the second electrical current sink I2 are very small. At this point in time, the voltage U2 is measured and compared with a reference value. Then, the specified value of the second electrical current sink I2 is set via the microprocessor M2 and the second controller CR2 from 19.25 mA to a value smaller than 18.75 mA, e.g. to 3 mA. The second controller CR2 sets the second electrical current sink I2 in such a manner, that the voltage at the resistor R6, which is measured via the second measuring resistor R2, corresponds to the desired value specification from the second microprocessor M2, i.e. equals 3 mA. Through the branch R2, I2 therewith flows 3 mA. The remaining electrical current of 18.75 mA−3 mA flows across the parallel branch from the resistor R4 and the switch S2. In the case of this circuit arrangement, test currents between 0 mA and a value of Itestmax2 are sellable in the second electrical current sink I2. The value Itestmax2 depends on the ratio between the resistances of the resistors R4 and R2. If are the values R4=100 ohm and R2=10 ohm, the test current in I2 can be set between 0 mA and R4*(total/(R4+R2)=100 ohm*18.75 mA/(100 ohm+10 ohm)=17.05 mA. Then, the specified value for the second electrical current sink I2 of 3 mA is set to a value larger than 19.25 mA. Via the second electrical current sink I2 and the measuring resistor R2 there again flows the branch current 18.75/2 mA, which is measurable via the voltage U2 and comparable with a reference value.

With these voltage measurements, the correct closing of the switch S2 and the ability of the second electrical current sink to set an electrical current smaller than 3.6 mA (i.e. to block) can be checked.

In the test time, the branch current Itotal minus 3 mA flows via the bridging resistor R4 and the switch S2. At the interface 11, an electrical current signal of 18.75 mA is constantly present.

The switch S2 is then opened, with the electrical current still being held by the first electrical current sink I1 at 18.75 mA.

At the point in time t4, the specified value for the first electrical current sink I1 is set via the first microprocessor M1 and the first controller CR1 to 19.25 mA. The first electrical current sink I1 therewith sets the electrical current at the interface 11 to 19.25 mA.

At the point in time t5, the specified value for the electrical current value of the second electrical current sink I2 is reduced from the value larger than 19.25 mA to 18.75 mA, so that the second electrical current sink I2 determines the electrical current flowing externally via the interface 11. At the two measurement resistors R1 and R2, the voltages U1 and U2 are measured, in order to monitor the presence of the respective required electrical currents. If the voltages U1 and U2 correspond to the reference values, the switch S2 has opened and the second electrical current sink I2 is in order.

In the diagram of FIG. 2 shown here, the testing is continued with the next test of the first electrical current sink I1.

Via the time-dependent switching of the current sinks I1, I2 with a corresponding desired value specifications for the respective electrical current values, no unwanted electrical current spikes on the 4 . . . 20 mA signal are produced at the interface 11 by the opening and closing of the switches S1 and S2.

The invention claimed is:

1. A field device of process automation technology, comprising:

at least one interface for output of an electrical current signal;

at least one specifying unit, which provides at least one value, on which depends the electrical current signal to be output via said at least one interface; and at least a first controllable electrical current sink and a second controllable electrical current sink wherein:

said first controllable electrical current sink and said second controllable electrical sink are connected in series and said first controllable electrical current sink and said second controllable electrical current sink are embodied in such a manner, that said first controllable electrical current sink and said second controllable electrical current sink are independently of one another settable to predeterminable electrical current levels; and said first controllable electrical current sink and said second controllable electrical current sink are connected with said at least one interface in such a manner that the electrical current signal present at said at least one interface is the lower of the predeterminable electrical current levels, to which said first controllable electrical current sink and said second controllable electrical current sink are set.

2. The field device as claimed in claim 1, wherein:

the field device signals the presence of an error of the field device by an error signal via said at least one interface; and the error signal lies within an error signal interval.

3. The field device as claimed in claim 2, wherein:

said error signal has an electrical current level below a predetermined value, especially smaller than 3.6 mA.

4. The field device as claimed in claim 1, further comprising:

at least one control unit, said at least one control unit is embodied in such a manner, that based on said at least one specifying unit, sets said first controllable electrical current sink and said second controllable electrical current sink to predeterminable electrical current levels.

5. The field device as claimed in claim 4, wherein:

said at least one control unit is embodied in such a manner, that based on said at least one specifying unit, controls said first controllable electrical current sink and said second controllable electrical current sink in such a manner, that the signal present at said at least one interface varies in a predeterminable interval.

6. The field device as claimed in claim 1, wherein:

said first controllable electrical current sink comprises at least a first electrical current sink, a first controller, a first resistor and a first measuring resistor; and said first measuring resistor is connected in series with said at least a first electrical current sink and is provided for sensing a first measurement voltage.

7. The field device as claimed in claim 1, wherein:

said second controllable electrical current sink comprises at least one second electrical current sink, a second controller, a second resistor and a second measuring resistor; and said at least a second measuring resistor is connected in series with said at least a second electrical current sink and is provided for sensing a second measurement voltage.

8. The field device as claimed in claim 1, wherein:

a capacitor and a diode are installed in said first controllable electrical current sink and/or in said second controllable electrical current sink.

9. The field device as claimed in claim 1, wherein:

parallel to said at least a first electrical current sink and to said first measuring resistor, a first switch and a first bridging resistor are provided.

10. The field device as claimed in claim 7, wherein:

parallel to said second controllable electrical current sink and to said second measuring resistor, a second switch and a second bridging resistor are provided.

11. The field device as claimed in claim 4, wherein:

said at least one control unit has at least two microprocessors, which control said first controllable electrical current sink and said second controllable electrical current sink essentially independently of one another.

* * * * *